Dec. 20, 1966     E. W. STUBLER     3,292,912
DRINK MIXER ADAPTER

Filed Sept. 3, 1965     5 Sheets-Sheet 1

INVENTOR.
EARL W. STUBLER
BY
*Robert W. Beach*
ATTORNEY Dec. 20, 1966  E. W. STUBLER  3,292,912
DRINK MIXER ADAPTER
Filed Sept. 3, 1965  5 Sheets-Sheet 5

INVENTOR.
EARL W. STUBLER
BY
ATTORNEY

United States Patent Office 3,292,912
Patented Dec. 20, 1966

3,292,912
DRINK MIXER ADAPTER
Earl W. Stubler, 4420 Meridian Ave.,
Seattle, Wash. 98103
Filed Sept. 3, 1965, Ser. No. 484,992
24 Claims. (Cl. 259—125)

The device of the present invention constitutes an improvement on the drink mixer attachment disclosed in my previous Patent Re. 25,490 issued November 26, 1963, now Patent No. 3,008,378 for Drink Mixer Attachment. This invention relates to a universal adapter for the various drink mixers used for mixing milk shakes and malted milks.

Drink mixers, although manufactured by various companies, are all designed for use only with one standard cup having a specific height. Because drink mixers utilize the cup as the instrument for effecting energization and de-energization of the mixer stirring spindle, it is necessary to employ some kind of attachment or adapter to make a mixer function when a cup of different height is used.

It is usually desirable to serve the drink in a paper cup of which any of various sizes may be used. However, unless some kind of attachment or adapter is employed, it is necessary to mix the drink in the standard cup and then pour the drink from such cup into the paper cup. By this procedure often the paper cup is not filled as full as desired, or excess drink is left in the mixing cup which must be discarded. Moreover, it is necessary to wash the mixing cup, which operation could be eliminated if the paper cup itself were used to hold the drink while it is being mixed.

In the past it has been possible to support paper cups on a mixer by using adapter collars. This proposed solution has the disadvantage of requiring the extra operation of putting in place the adapter collar, removing it after the drink has been mixed and subsequently washing it. Moreover, such solution involves selecting an adapter collar of exact diameter to fit a cup of a particular category and of the correct height so that the collar and cup in combination will correspond to the height of the standard cup. These adapter collars, which are supplied by various paper cup manufacturers, are made of stainless steel and are very expensive. Moreover, the particular assortment of adapter collars sold by a given paper cup company will work with its particular line of cups only and is useless with paper cups of another brand. The use of adapter collars is, under the best of circumstances, complicated and awkward. Any establishment dependent upon adapter collars in its operation is very sadly limited in its output capacity, and its entire work area unavoidably becomes cluttered, disorganized and prohibitively unsanitary. To the above indictments must be added that use of adapter collars permits the accommodation of only a limited range of sizes of paper cups, in actual practice. It is utterly futile for the paper cup companies to attempt further additions to the present confusing line of expensive adapter collars.

The other proposed solution for this problem has been to provide a universal adapter which would automatically cooperate with cups of all sizes and which, itself, could constitute the instrument to control actuation and deactivation of the spindle-driving mechanism. Such an adapter is disclosed in my reissue patent Re. 25,490, mentioned above, but such adapter has some disadvantages which are overcome by the adapter of the present invention.

It is a principal object of the present invention to provide an adapter for drink mixers which can be used to energize the mixing spindle by putting a cup in place in the mixer and to deenergize it by removing the cup from the mixer, and one which is applicable to all makes of drink mixers.

A further object is to provide such a drink mixer adapter which can be used with mixers of the various types and makes without requiring modification of the mixers, or appreciable alteration of the adapter, although certain features of adjustment which can be altered quickly and easily are provided.

A further object is to enable such a drink mixer adapter to be applied to a mixer and removed from a mixer quickly and easily.

Moreover, it is an object to provide such a drink mixer adapter which is sanitary and easy to clean.

It is also an object to provide such a mixer adapter which is attractive in appearance and in which most of the moving parts are concealed.

An additional object is to provide such a drink mixer adapter which is compact and light, while at the same time it is of rugged construction.

It is a further object to provide such a drink mixer adapter which includes a cover arranged to fit evenly on the rim of a cup irrespective of its size.

A drink mixer adapter capable of accomplishing these objects may be in the form of an elongated body in the shape of a casing of flat, rectangular cross section, or plate means, the upper end of which is adapted to engage the spindle-driving control of the mixer. On this casing is slidably mounted a cup lip-engaging hook or cover. Such casing is held in place by a combined adapter-supporting bracket and cup rest. The cup lip-engaging hook or cover normally is held in its lower position by resilient means mounted on the body, preferably concealed within the body casing, which means are stressed by movement of the slide upward along the body casing or plate effected by placing a cup in mixing position, and such stress produces a sufficient lifting force on the body to cause it to initiate the spindle-driving operation. Such resilient means may be compression springs or a tension elastic band, for example.

Figure 1:
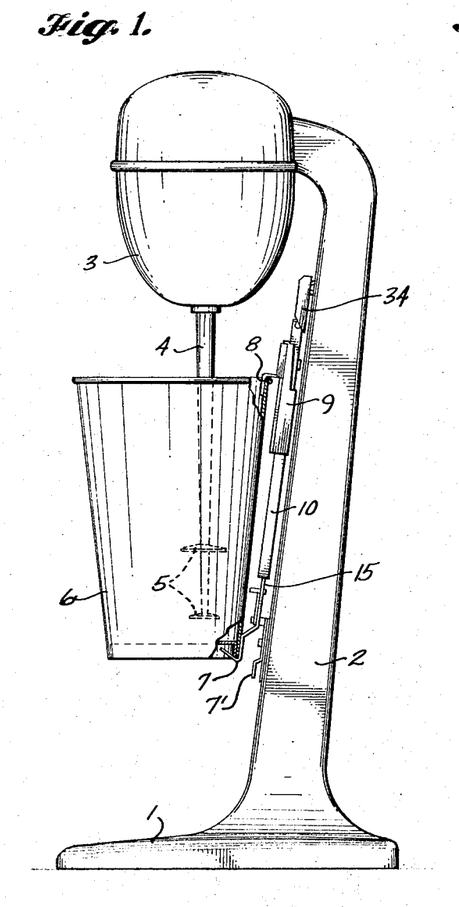
FIGURE 1 is a side elevation of a drink mixer to which the adapter of the present invention has been applied.

In FIGURE 1 a representative type of typical drink mixer is shown including a base 1 supporting a column 2, the upper end of which carries an electric motor 3. This motor drives the spindle 4 carrying one or more mixing disks 5, which may be radially corrugated to produce turbulence in liquid by rotation of the spindle. The liquid and solid material to be mixed to make the drink are placed in a container 6, which usually is of paper. The bottom flange of the cup is engaged in a hook 7 of the adapter constituting a rest for the cup, and a rim of the cup is engaged under an upper hook 8 to prevent the weight of the cup and its contents from tipping the cup away from the column 2 about the cup rest 7 as a center.

Figure 2:
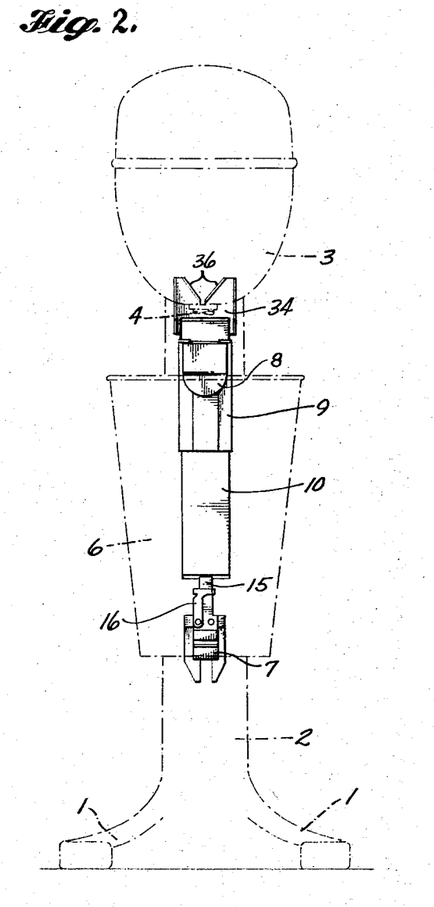
FIGURE 2 is a front elevation of such adapter.

Thus, it will be seen that the cup is held in place on the mixer by the adapter of the present invention instead of being engaged directly with elements secured directly to the mixer stand column 2. The hook 8 with which the cup lip is engaged is carried by a slide 9 which is slidable along the body 10 of the adapter. This body is very compact, as shown particularly in FIGURES 1, 2 and 4, and preferably is in the form of a generally flat, elongated casing of rectangular cross section, as shown in FIGURES 7 to 11, inclusive, and includes at least one plate member along which the slide moves.

Figures 6, 7, 8, 9, 10, 11, 12:
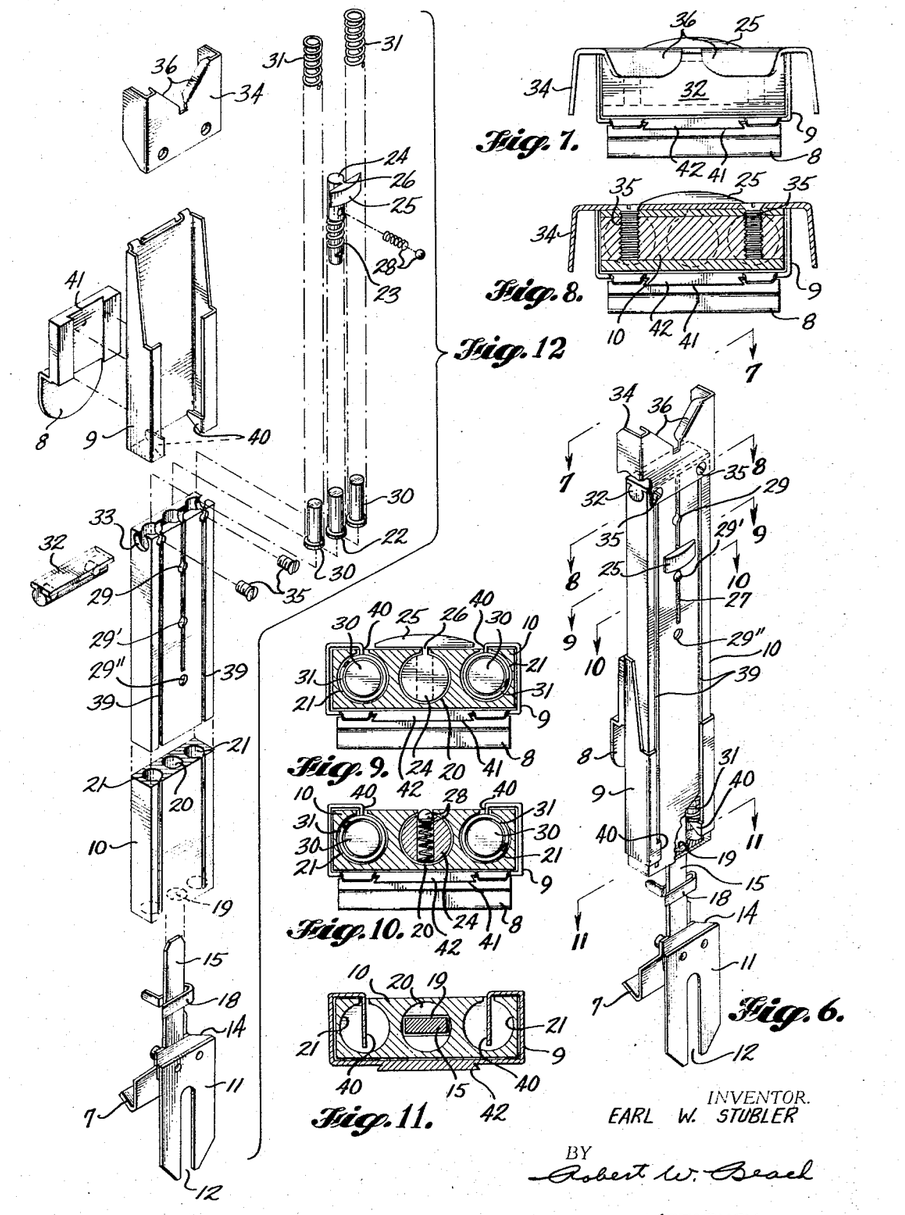
FIGURE 6 is a top perspective of the adapter viewing the side which would be adjacent to the column.
FIGURE 7 is a plan of the adapter viewed from line 7—7 of FIGURE 6.
FIGURE 8 is a transverse section through the adapter on line 8—8 of FIGURE 6.
FIGURE 9 is a transverse section through the adapter on line 9—9 of FIGURE 6.
FIGURE 10 is a transverse section of the adapter on line 10—10 of FIGURE 6
FIGURE 11 is a transverse section of the adapter on line 11—11 of FIGURE 6.
FIGURE 12 is a top perspective of the adapter looking at the side adapted to be disposed adjacent to the mixer column, parts being shown in exploded relationship.

The adapter casing 10 is held in a position alongside the mixer stand column 2 by a support in the form of a bracket 11, shown best in FIGURE 6 and at the bottom of FIGURE 12. The foot of this bracket is bifurcated to provide a deep notch 12 opening downward to slide over the mounting screw 13, which normally holds the customary cup bottom rest hook 7' in position. When the adapter support is mounted on the mixer column 2 this screw is loosened and the rest hook 7' is used to constitute a clamping plate which can be secured against the bifurcations of the support bracket to hold it in the proper position adjusted elevationally relative to the mixer stand column 2. It is not necessary to remove the screw.

In order to support the body 10 alongside the mixer column 2, a flange 14 projecting forwardly from the bifurcations at the bottom of the bracket carries an upwardly projecting stem 15 which serves as the direct support for the adapter body. A latch lever 16 having its lower end connected by pivot 17 to the stem 15 can be swung about such pivot into a position in overlapping registry with the stem so as to engage hook 18 with such stem after the adapter has been positioned on the mixer stand. The upper end of the stem is inserted through slot 19 in the lower end of the body 10 so that the interengagement of such stem and slot positions and guides the body for elevational adjustment, while the stem is fixed.

The body carries supporting means for resilient force means, shown as a central bore 20 extending lengthwise of the body casing in registry with the slot 19. At opposite sides of and parallel to such central bore are two additional bores 21. In the central bore slides a plug 22 fitted in the lower end of a compression spring 23 received in the bore. In the upper end of the spring an upper plug 24 is fitted which is connected to a button 25 by a narrow neck 26. Such neck extends through a slot 27 in the back of the body casing 10 so that the button 25 is accessible, while the plug 24 is concealed within the casing.

The plug 22, in the lower end of spring 23, bears against the upper end of the supporting and guide stem 15, and if the upper plug 24 is effectively secured to the body 10 the compression force developed by the spring will support the weight of the adapter and urge it upwardly. The degree of force applied by the spring to the body can be altered by the position at which the upper plug 24 is anchored to the adapter body lengthwise of it. For the purpose of anchoring such plug to the adapter body a detent 28, shown best in FIGURE 10, is provided in the plug 24. This detent can seat in apertures in the casing along the line of the slot 27 and three of such apertures, 29, 29' and 29'', are shown in FIGURES 6 and 12. The force of spring 23 exerted upward on the adapter body is, of course, least when the detent is engaged in aperture 29, the spring force is greatest when the detent is engaged in aperture 29'' and the spring exerts a force of intermediate value when the detent is engaged in aperture 29'.

Plugs 30, fitted in the lower ends of the side compression springs 31, slide in the two side apertures 21. The upper end of the body 10 is closed by a suitable cap 32 shown in FIGURES 6 and 12 as including an end plate and a cylindrical plug integral with it. Such plug slides snugly into the bore 33 in the extreme upper end of the casing, which bore extends transversely of the length of the casing and of the bores 20 and 21, so as to close the ends of such bores and form a seat for the upper ends of springs 31.

Figure 5:
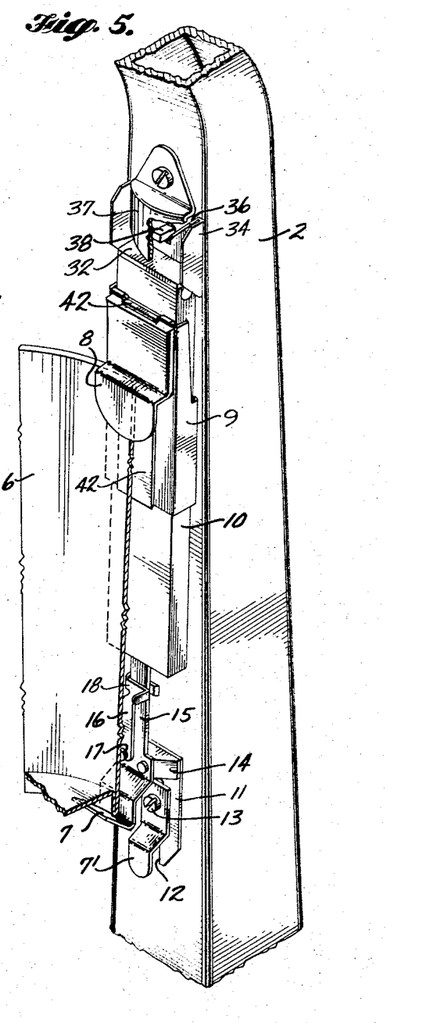

To the upper end of the adapter body is secured a channel-shaped projection 34 by screws 35 threaded into the body, as shown best in FIGURE 8. The upper end of the projection 34 has in it a V-shaped notch formed by flanges 36 flaring upward from the surface of the projection generally in continuation of the back of the casing 10. These flanges are sufficiently narrow as to fit behind the hook 37 on the mixer stand column 2, which is conventionally provided in one general type of mixer to engage the lip of the cup. The side flanges of the channel are wide enough to engage the hook sides for centering the upper end of the adapter body relative to the hook. The notch flanges 36 received behind the hook engage the switch finger 38 behind such hook, as shown in FIGURE 5, to raise such finger for initiating rotation of the mixer spindle 4, such as by energizing motor 3. Another type of mixer has a cup rim-engaging notch into which the adapter notch formed by flanges 36 can fit to center the adapter. Raising the adapter lifts the notched mixer member to effect rotation of the mixer spindle. Thus in all cases the adapter notch serves the same function as normally served by the cup lip to control rotation of the mixer spindle.

Slots 39 are provided in the back of the body casing 10, as shown in FIGURES 6 and 12, which extend lengthwise of the casing in registry with the side bores 21 and communicate with such bores. Into these slots project blades 40 formed integral with opposite sides of the slide 9. These blades fit beneath and engage the lower ends of plugs 30 so that the force of the springs 31 exerted on such plugs tends to hold the slide in its lowest position. The hook 8, behind which the lip of a cup can engage, has a shallow groove 41 in its base, as shown in FIGURE 12, which is engageable with a thin projection 42 on the face of slide 9 shown in FIGURES 4, 5 and 7 to 11. Preferably such groove 41 and projection 42 are of interfitting dovetail shape. In any event, the relative widths of the projection and groove are such that the groove can be fitted snugly, but easily, over the projection at the lower end of the slide, and the hook base can then be slid upward until the upper edge of the hook base engages stop tabs at the upper end of the slide, shown in FIGURES 4, 5, 7 to 10 and 12.

Figures 3, 4:
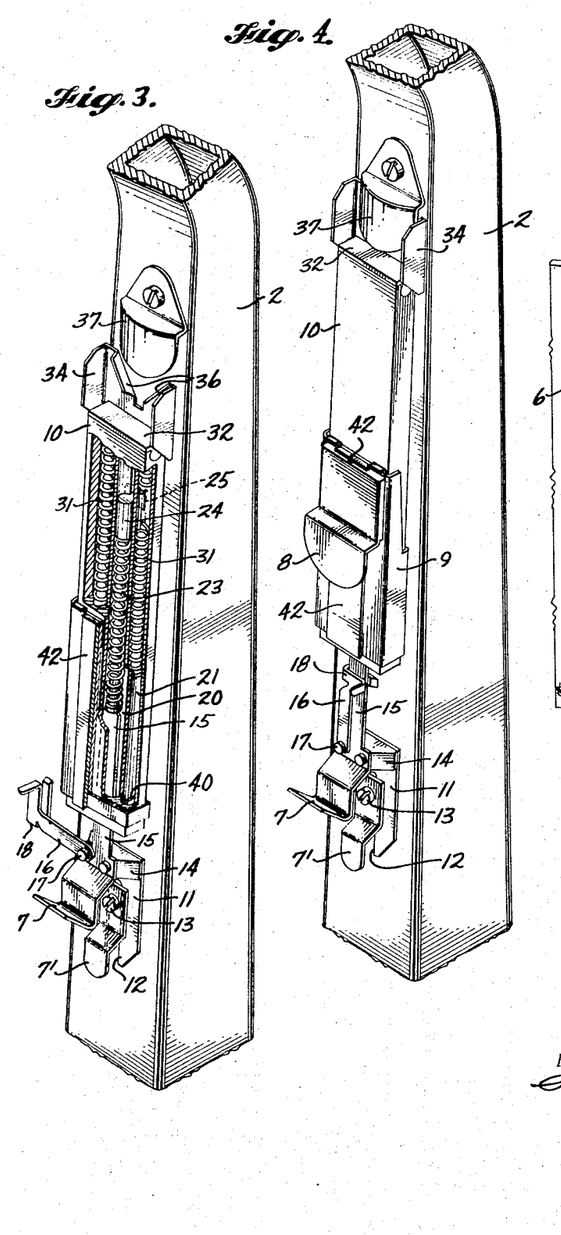
FIGURE 3 is a top perspective of the adapter in the process of being applied to the column of a drink mixer, parts being broken away.
FIGURE 4 is a similar view showing the adapter in place on the mixer column ready for use and FIGURE 5 is a similar view showing a portion of a representative cup engaged with the adapter.

When a cup rim is engaged behind hook 8 and the cup is lifted when the adapter is in place on the column of the mixer, as shown in FIGURES 4 and 5, the slide will be moved upward along the casing 10 in the manner illustrated in FIGURE 5. By such upward movement of the slide the blades 40 carried by it will move upward beneath the plugs 30 to increase the compression of springs 31 between such plugs and the adapter body cap 32. By such upward movement of the plugs compressing springs 31, an increased upward force will be transmitted from such body through the projection 34 to the switch finger 38. When the switch finger has reached its upper limiting position upward movement of the adapter body will be terminated, but the cup-engaging hook 8 can continue to move slide 9 upward along the body into a position such as shown in FIGURE 5. While such slide movement will increase the compression of springs 31, and hence the upward force produced by them, such springs should be sufficiently limber so that the force developed by the springs will not be increased greatly while allowing ample travel of slide 9 along the adapter body.

Figures 13, 14, 15, 16, 21, 22:
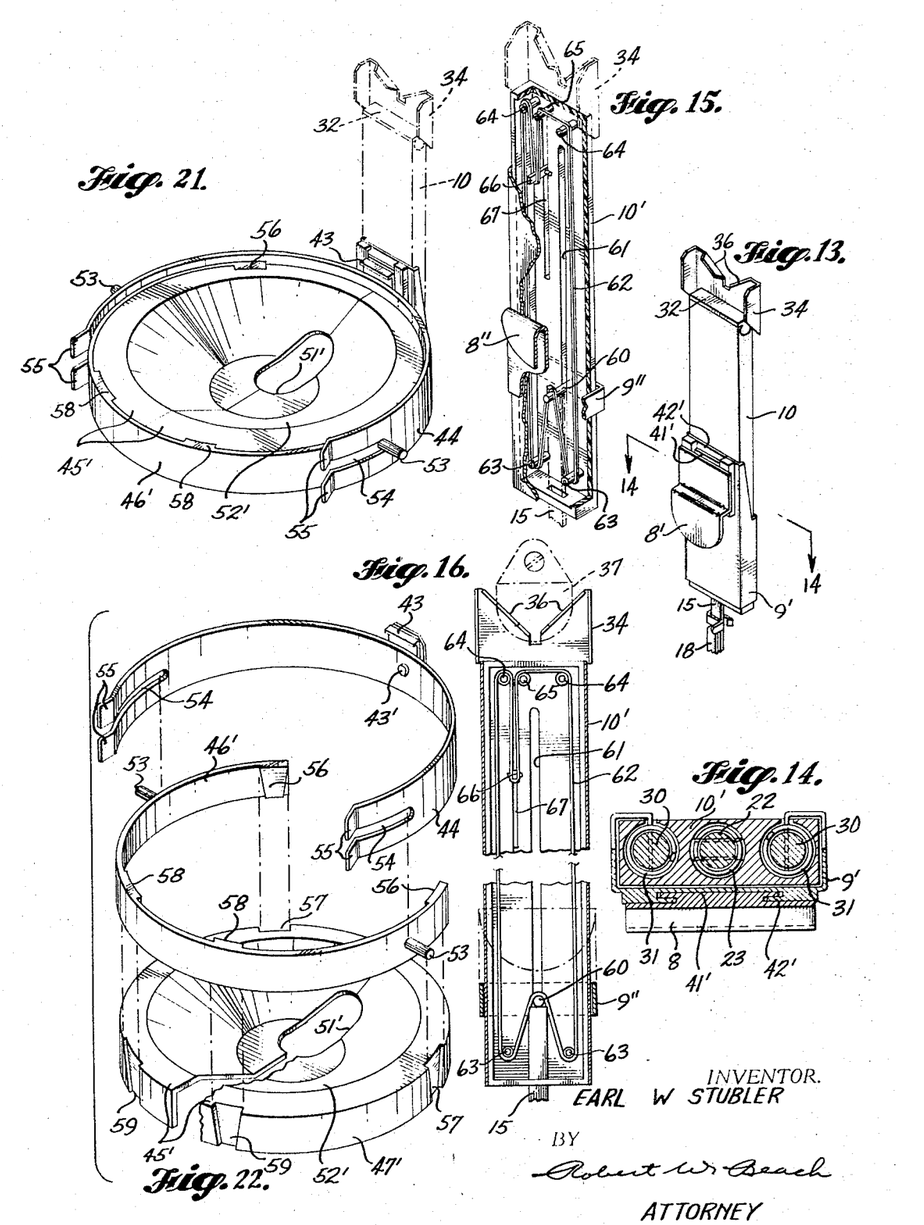
FIGURE 13 is a top perspective of a somewhat modified type of adapter showing the side which would be disposed remote from the mixer column.
FIGURE 14 is a transverse section through such adapter taken on line 14—14 of FIGURE 13.
FIGURE 15 is a top perspective of a further modification of the adapter looking at the side which would be disposed remote from the mixer column, parts being broken away.
FIGURE 16 is an elevation of such adapter viewing the same side and having parts broken away.
FIGURE 21 is a top perspective of a cover component of a mixer adapter of a type somewhat different from that shown in FIGURE 18.
FIGURE 22 is a top perspective of such cover component showing parts in exploded relationship and with portions broken away.

In FIGURES 13 and 14 a somewhat modified type of attachment is shown. In this instance the base of the hook 8' engageable by a cup rim has a T-shaped projection 41' on its inner side, as shown in FIGURES 13 and 14. This projection is engageable in a T-shaped groove 42' formed in the front face of the slide 9'. The shape of the groove 42' at its upper end is formed without the undercut portions so that the edge flanges of the projection 41' can bear against the ends of grooves behind parallel flanges on the slide 9' to limit relative movement of the hook and slide. When the lip of a cup is engaged behind the hook 8' and such cup is lifted, therefore, it will move the hook 8' upward, which in turn will raise slide 9' in the manner previously described with reference to slide 9. Such slide 9' has blades 40, as previously described, which pass through slots 39 in the body of the adapter and engage beneath the plugs 30 in the lower ends of springs 31 so as to compress such springs as the slide is raised.

FIGURES 15 and 16 show a further modification of the adapter in which an endless elastic band constitutes resilient force means operated by movement of the slide 9" upward along the body 10' by engagement of the rim of a cup behind the hook 8". In this construction the adapter body is supported and guided for elevational movement by a stem 15 mounted on the column of the mixer stand, as described previously. Also, the finger of the motor control switch for the mixer spindle motor is engageable by flanges 36 on the upper end of the projection 34, which flare upwardly to form a V-shaped notch, as described in connection with the other forms of adapter. Moreover, the body 10' of this adapter is generally of the same size and shape as the bodies of the adapters shown in FIGURES 2 to 12 and in FIGURES 13 and 14, and includes front and back plates.

The body of the adapter 10', shown in FIGURES 15 and 16, differs from the bodies of the adapters described above, however, in being almost entirely hollow instead of having 3 bores extending lengthwise of the adapter body. From the slide 9" a pin 60 projects through a slot 61 extending lengthwise of the adapter body in the wall opposite that along which the cup-engaging hook 8" slides. This pin engages beneath the lower stretch of an endless elastic band 62, which is received in the hollow of the adapter casing and encircles two bottom rollers 63 adjacent to opposite edges of the casing and two upper rolls 64 adjacent to the upper end and opposite edges of the casing. These rollers are mounted on stub shafts projecting into the cavity of the casing from either plate, but such shafts should be of the cantilever type to enable the loop of the endless band 62 to be applied easily to the rollers.

It may be desirable to be able to alter the initial stress of the elastic band 62 so as to change the upward force exerted by such band on the adapter by movement of slide 9" upwardly along the adapter body. The initial and/or subsequent force applied by the elastic band to the adapter body can be varied in any of several ways. One way is simply to exchange one band 62 for another having a different cross-sectional size or shape, or being of different length in relaxed condition. Another expedient is to vary the initial condition of stretch for an elastic band of given length by providing additional sets of rollers spaced downward from the upper end of the cavity.

A further expedient for regulating the tension of the elastic band 62 is shown in FIGURES 15 and 16. In this instance an additional guide roller 65 is located in the upper end of the cavity substantially in alignment with the rollers 64 and spaced a short distance from one of such rollers. An anchor pin 66 is received in a slot 67 extending lengthwise of the casing substantially parallel to slot 61 and located substantially midway between roller 65 and the adjacent roller 64. The stretch of elastic band 62 between roller 65 and the adjacent roller 64 is then looped downward around the pin 66. Such pin may be provided with a handle exteriorly of the casing which can be grasped to adjust the position of the pin along slot 67. It will be evident that as the anchor pin 66 is moved downward along such slot the tension of the elastic band 62 will be increased and conversely, as the anchor pin is moved upward along such slot the tension of such band is reduced.

In use the slot in the lower end of casing 10' is slipped over the supporting and guiding stem 15 and the adapter is slid downward until the slide pin 60 engages the upper end of the stem 15, as shown in FIGURE 16. The adapter can then be pressed downward until the projection 34 on its upper end can be slipped behind the conventional cup lip-retaining hook 37. During such manipulation the adapter would be substantially in the position of the adapter shown in FIGURE 3. Under these circumstances the stem 15 would have momentarily raised the pin 60 and slide 9" a substantial distance relative to the casing 10', such as approximately to the position shown in FIGURE 15. The projection 34 is then slipped upward behind the hook 37 so that the motor switch finger 38 will be lodged in the notch in the upper end of the projection 34 formed by the divergent flanges 36. The adapter is then in position ready for use, as shown in FIGURE 4.

All of the adapters described thus far are used in the same manner. After the adapter has been mounted on the mixer in the manner described by inserting the stem 15 into the lower end of the adapter casing, and slipping the extension 34 upward behind the cup-retaining hook 37 of the mixer, a cup of any size and shape can be placed in the mixer in substantially the usual manner. Instead of inserting the lip of the cup behind the conventional hook 37, however, the cup lip is inserted behind the hook 8, 8' or 8", of the slide 9, 9', or 9", of the adapter. The cup is then moved upward to raise the slide 9, 9' or 9", until the bottom of the cup can be engaged with the rest 7 in the manner shown in FIGURE 5. It will be evident that the slide 9, 9' or 9", will be raised by this procedure to the extent necessary to accommodate the height of the particular cup, but such cup can be of any height not exceeding the distance between the rest 7 and the uppermost position of hook 8. Also, the cup can be of any diameter.

As previously explained, raising of the slide 9, 9' or 9", by lifting the cup engaged with hook 8, 8' or 8", will cause the resilient force means in the form of springs 31, shown in FIGURE 12, or the elastic band 62, shown in FIGURES 15 and 16, to exert a sufficient lifting force on the adapter body so as to cause the notch of projection 34 to bear upwardly on the switch finger 38 behind hook 37 to energize spindle-driving motor 3. When the mixing operation has been completed it is only necessary to disengage the lower end of the cup from the rest 7 and lower the cup so that the resilient force means can press the slide 9, 9' or 9" down and relieve the upward force exerted on the adapter body sufficiently to enable the spring-pressed switch finger 38 to move into motor-deenergizing position.

Figures 17, 18, 19, 20:
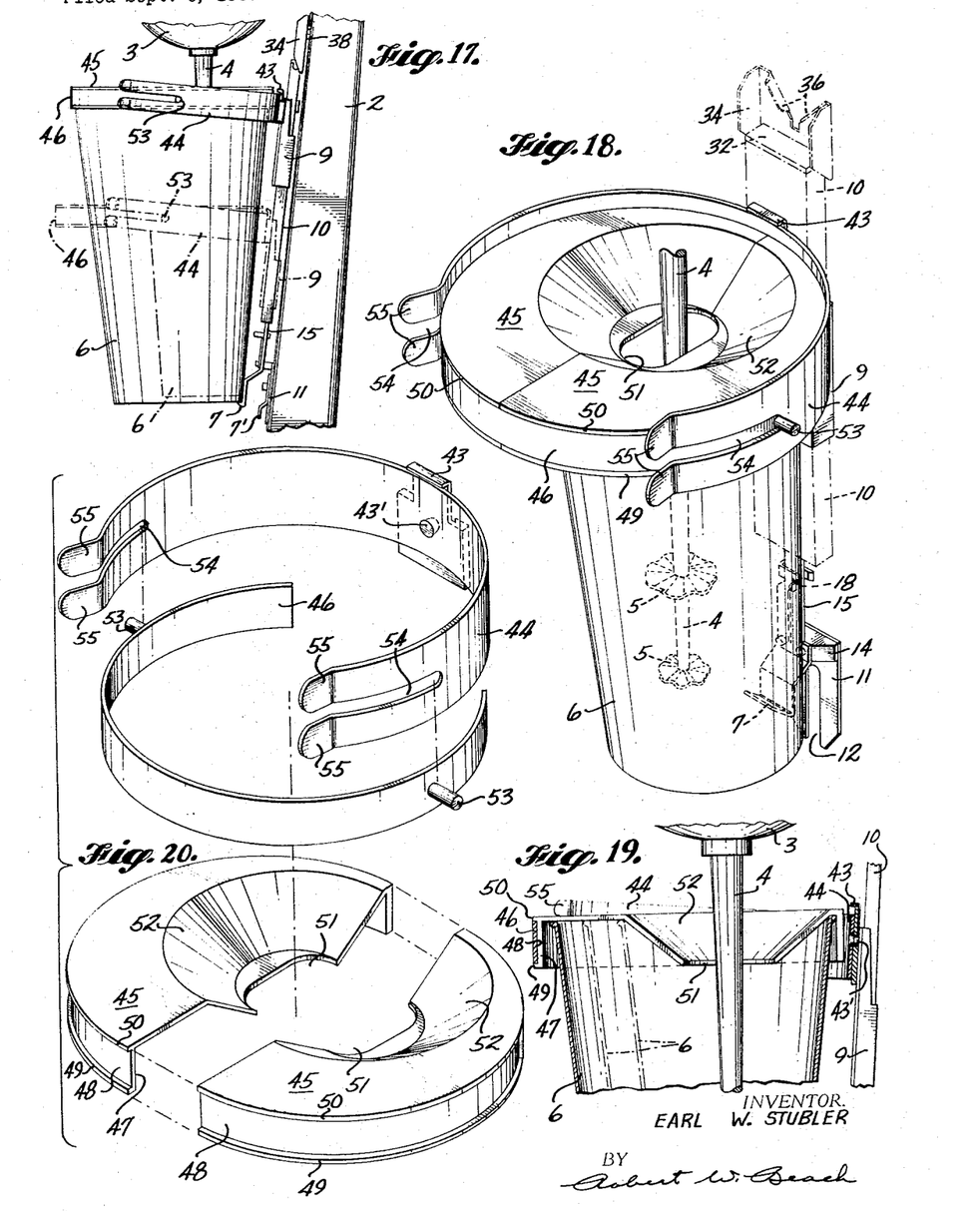
FIGURE 17 is a side elevation of a drink mixer adapter of the present invention provided with a cover and FIGURE 18 is a top perspective of the cover component with the adapter being shown in phantom on an enlarged scale.
FIGURE 19 is a vertical section through the cover component of the adapter.
FIGURE 20 is a top perspective of the cover component of the adapter showing parts in exploded relationship.

A difficulty frequently experienced with drink mixers is the tendency of some liquid to be splashed out of the cup during mixing, particularly if the cup has been filled somewhat too full. Some users, therefore, would prefer to provide a cover to be placed on the cup during mixing and cover means for this purpose are shown in FIGURES 17 to 22 of the drawings. Where such cover means are used it is again desirable for the device to be able to accommodate cups of different heights and diameters over a considerable range. As indicated in FIGURE 19, the cover means illustrated in FIGURES 17 to 20 are adapted for use with containers of various diameters within the range between that shown in full lines and the cup of smallest diameter indicated by broken lines.

In providing cover means it is, of course, desirable to cover the open top of a cup as completely as possible. It is also desirable to be able to use a universal type of adapter and cover mechanism for various makes of mixer. Also, it is desirable to be able to convert an adapter quickly and easily from one having a cup lip-engaging hook to one having cup lip-engaging cover means, and vice versa. Consequently, it is not necessary to modify the slide 9 shown in FIGURES 4 and 5, for example, in order to utilize cover means except to remove the cup lip-engaging hook 8 from the slide. This operation is accomplished quickly by simply sliding such hook downward along the projection 42 until the complemental dovetail configurations of such projection and the hook base groove 41 have been disengaged. The cover-means-supporting plate 43, shown in FIGURES 18 and 20, can then be fitted onto the projection 42 in place of the hook base.

The cover-means-supporting plate 43 has mounted on it an outer arcuate clamp 44 by a pivot 43', which enables such outer clamp to tilt relative to the supporting plate. Such band embraces the cover proper, which is formed in two semicircular sections 45 shown in FIGURES 18 and 20. Provision of such a sectional cover enables its parts to be separated for application around the mixer spindle 4. Such two sections normally are held in abutting relationship by an inner arcuate clamp band 46 extending around the downwardly projecting flange or skirt 47 of the cover sections. Such band should fit reasonably snugly in the shallow external groove 48 in the skirts of the cover sections between lower and upper ribs 49 and 50, shown best in FIGURE 20. The band 46 will, of course, be quite resilient so as to embrace the cover sections 45 and press them together to form a unitary cover.

In the central portion of the abutting edges of the cover sections 45 are notches elongated along such abutting edges which are located in corresponding positions so that they will be in registry when the cover sections are assembled, as shown in FIGURE 18. The length of the slot 51, formed by such cooperating notches, will extend diametrally of the cover so as to accommodate the projection through such slot of spindles 4 of different mixers having their spindles located different distances from the cup-carrying column adjacent to the spindle.

In order to prevent a cup 6 from having its rim engaged by the cover sections 45 in a position spaced farther than desired from the mixer column 2, it is preferred that corresponding portions of the cover sections have depressed portions 52 cooperating to form a substantially conical depression. As indicated by the line at the right of FIGURE 19, representing the cup wall, one portion of the cup lip will be held close to the edge of the cover irrespective of the width of the cup. Consequently, the spindle 4 of the mixer will always be located substantially concentrically of the cup irrespective of the width of the cup. Moreover, the clamp band 46 will always be held in a predetermined elevation relative to band 44 by engagement of diametrically opposite trunnions 53 projecting outwardly from clamp band 46 engaging in open-ended slots 54 in the opposite ends of the outer band 44. The band 46 and cover sections 45 embraced thereby can be tilted about such trunnions relative to band 44, and band 44 can tilt about the axis of pivot 43', as may be necessary to enable the cover sections to seat evenly on the rim of the cup, as indicated in FIGURE 19, thus providing a gimbal mount for the cover.

In addition, in order to fit cups of different height, whether of paper or metal, the container-clamping position of the cover can vary, as indicated by broken lines in FIGURE 17, in the same manner that the elevation of a cup rim-engaging hook can vary, as explained previously. Irrespective of the height of the cover the trunnions 53 will also enable the bottom of a cup 6 to be swung toward and away from the column 2 for engaging the bottom of the cup with and disengaging it from the rest 7. Such inner clamp band and the cover sections secured thereby can be engaged easily in the clamp band 44 by forming the end of the bifurcations above and below the open-ended slots 54 as outwardly bent fingers 55, as shown in FIGURES 18 and 20. Pressure of the inner band 46 in engagement with such fingers will cause the ends of band 44 to spread so as to accommodate the full diameter of the clamp 46 as the trunnions 53 enter the slots 54 during their movement toward the relationship shown in FIGURE 18.

In the modified cover construction shown in FIGURES 21 and 22 the external clamp band 44, its supporting plate 43 and pivot 43' and the slots 54 and bent fingers 55 are essentially the same as illustrated and described in connection with FIGURES 17 to 20. In this instance, however, the slot 51' formed by cooperating notches in the adjacent edges of the cover sections 45' are not located concentrically of the depressed portions 52' of the cover sections. In this instance such depressed portions are located substantially concentrically of the cover sections so that the rim of a cup will be held substantially concentrically with the cover irrespective of the diameter of the cup. The conically depressed portions 52' will, however, always fit evenly on the cup rim because of the ability of the cup to tilt relative to the outer clamp band 44 to a reasonable extent about trunnions 53.

In this instance the inner clamp band 46' has dovetailed end projections 56 on the inner side of the band tapering downwardly to engage corresponding downwardly tapered notches 57 in the periphery of the cover sections. In addition, such band has dovetail projections 58 tapering downwardly from its inner side adjacent to the central portion of the band which engage complemental downwardly tapering notches 59 in the flanges or skirts 47' of the cover sections 45' at their sides opposite notches 57. Such projections and notches may, if preferred, not be of dovetail configuration, but it is very desirable that such projections and notches taper downwardly in order to enable them to be interfitted easily and to enable the band to transmit from the adapter slide to the cover sections a downward pressure so that the cover can be clamped onto the rim of a container.

The operation of the cover sections shown in FIGURES 21 and 22 is similar to that of the cover sections shown in FIGURES 17 to 20. In each instance the cover sections can be assembled quickly and easily within the clamping band 46, and such clamping band can then be engaged with the outer clamping band 44 in the manner described with reference to the construction shown in FIGURES 17 to 20. When thus assembled splashing of the mixture out of the cup is prevented. The only open portion of the cover structure is that formed by the slot 51, or 51', immediately around the spindle 4 of the mixer. During the mixing operation the stirring action of the mixing disks produces a vortex having a depressed central portion so that the mixture does not tend to splash out through the central slot. Spilling or splashing of the mixture from the peripheral portion of the cup top is prevented by the cover seating evenly on the rim of the cup resulting from its gimbal mounting structure described above.

Inasmuch as the drink mixture can not cling to a highly polished surface, it is preferred that in the manufacture of the covers shown herein their inside surfaces be given a very smooth finish such as by polishing or plating. Whenever desired, however, the cover may be rinsed by placing in the mixer a cup of water which is agitated by the mixer. This process will, of course, also rinse the mixer spindle. The cover sections and inner clamp band can be removed quickly and easily from the outer clamp band 44. Such band and its supporting plate 43 can easily be slid downward out of the adapter slide. Thus, such cover sections, and the inner and outer clamps for them, can all be quickly demounted and washed readily.

Not only the cover attachment, but the adapter itself can be removed from the mixer for washing. For this operation it is not necessary to remove or loosen the supporting stem 15 which remains firmly in place on the mixer stand column. It is only necessary to swing the adapter retainer latch from the position shown in FIGURES 4 and 5 downward to the position of FIGURE 3. The adapter body 10 can then be slid downward in opposition to the force exerted by spring 23 on stem 15 until the adapter reaches the position shown in FIGURE 3 in which the notch flanges 36 have cleared the cup lip retaining hook 37. The adapter can then be tilted forward or sidewise, or both, so that its upper end projection will clear the hook 37 and the adapter can then be lifted off the stem, washed and replaced, following the installation procedure described above.

While the clamp bands preferably are of metal, such as stainless steel or aluminum, to provide adequate clamping resiliency, the cover sections themselves can be either of similar metal or of plastic material, as may be preferred. Also, while it is preferred that most of the adapter parts be made of stainless steel or aluminum, some of such parts as may be appropriate can also be made of suitable hard plastic material.

Although only one illustrative form of drink-mixer cup rest has been shown in the drawings, the adapter can be held by a supporting screw or screws of the cup rest of all types of existing mixers. In all cases, the adapter can be interchanged from one manufacturer's drink mixer to another.

I claim:

1. An adapter for a drink mixer having a mixer-actuating member, comprising a body casing, supporting means engageable with the lower end of said body casing for supporting the same from the drink mixer and guiding said casing for elevational movement relative to the drink mixer, projection means on the upper portion of said casing engageable with the mixer-actuating member, a slide mounted on said casing guided for sliding movement therealong and including a slide-carried member projecting into said casing and cup-holding means engageable with the rim of a cup for holding the same, and resilient force-exerting means within said casing, engageable by said slide carried member and operable by upward movement of said slide to exert an upward force on said casing to move said projection into position effecting mixer-operating actuation of said mixer-actuating member.

2. The adapter defined in claim 1, in which the body casing has a hollow therein and the resilient force-exerting means are spring means received within said hollow.

3. The adapter defined in claim 1, in which the body casing is hollow, the resilient force-exerting means include an endless rubber band, a plurality of band-engaging members mounted in spaced relationship in the hollow of the casing and engaged by said rubber band, and means connected to the slide and engageable with said rubber band to increase the force exerted thereby on the casing as the slide is moved upward along such casing.

4. The adapter defined in claim 3, and means carried by the body casing, engageable with the rubber band and adjustable relative to the casing for varying the tension of the rubber band.

5. The adapter defined in claim 1, in which the supporting means engageable with the lower end of the body casing includes a stem mounted on the drink mixer and projecting into the lower end of the casing through a slot therein.

6. The adapter defined in claim 5, and resilient supporting means within the body casing engageable between the casing and the stem for supporting the casing resiliently from the stem.

7. The adapter defined in claim 6, in which the resilient supporting means include a spring within the body casing.

8. The adapter defined in claim 6, in which the resilient supporting means include a rubber band.

9. The adapter defined in claim 1, in which the cup-holding means is a hook engageable over the rim of a cup.

10. The adapter defined in claim 1, in which the cup-holding means is a circular cover, clamp means operable to support said cover, and disengageable cover supporting means securing said clamp means to the slide.

11. The adapter defined in claim 10, in which the disengageable cover supporting means includes interfitting projection and groove elements.

12. The adapter defined in claim 10, in which the disengageable cover supporting means includes pivot means supporting the clamp means for tilting about an axis extending generally radially of the cover through the cover supporting means.

13. The adapter defined in claim 12, in which the pivot means tiltably supporting the clamp means includes gimbal means supporting the clamp means for universal tilting.

14. The adapter defined in claim 10, in which the cover includes two semicircular sections held in edge-abutting relationship by the clamp means.

15. The adapter defined in claim 14, in which the abutting edges of the two cover sections have complemental notches cooperatively forming an aperture through which the mixer spindle passes.

16. The adapter defined in claim 14, in which the two cover sections have depressions adapted to extend into the upper end of a cup the rim of which is engaged by the cover.

17. The adapter defined in claim 16, in which the depressions in the two cover sections cooperate to form a substantially conical depression offset from the center of the cover.

18. The adapter defined in claim 16, in which the depressions in the two cover sections cooperate to form a substantially conical depression concentric with the cover.

19. In a drink mixer including a body, a cover engageable with the rim of a cup supported in operative relation to the drink mixer, cover-supporting means supporting said cover for tilting relative to the drink mixer body to enable said cover to fit evenly on the rim of the cup, and means mounting said cover-supporting means from the drink mixer body and guiding said cover-supporting means for elevational movement relative to such body.

20. In a drink mixer, a cover engageable with the rim of a cup supported in operative relation to the drink mixer, said cover including two complemental sections, one of said cover sections having a notch in an edge thereof adapted to embrace the mixer spindle by movement of such cover section relative to the spindle transversely of the length of such spindle, and clamp means circumferentially embracing said two cover sections for holding them in assembled relationship and quickly releasable to enable said cover sections to be disassembled.

21. An adapter for a drink mixer having a mixer-actuating member, comprising elongated body plate means, supporting means engageable with said body plate means, supporting the same with its length upright and guiding the same for elevational movement relative to the drink mixer, projection means on the upper end of said body plate means engageable with the mixer-actuating member, slide means mounted on said body plate means, guided for sliding movement therealong and including cup-holding means engageable with the rim of a cup for holding the same, and resilient force-exerting means carried by said body plate means, engageable by said slide means and operable by upward movement thereof to exert an upward force on said body plate means to move said projection into position effecting mixer-operating actuation of said mixer-actuating member.

22. An adapter for a drink mixer having a mixer-actuating member, comprising elongated body plate means, supporting means engageable with said body plate means, supporting the same with its length upright and guiding the same for elevational movement relative to the drink mixer, projection means on the upper end of said body plate means engageable with the mixer-actuating member, slide means mounted on said body plate means, guided for sliding movement therealong and including cup-engaging means engageable by the rim of a cup for moving said slide means upward along said body plate means, and resilient force-exerting means carried by said body plate means, engaged with said slide means and operable to exert a downward force on said slide means to move said slide means downward along said body plate means when the cup rim is withdrawn from engagement with the cup-engaging means.

23. An adapter for a drink mixer having a mixer-actuating member, comprising a body casing, supporting means engageable with the lower end of said body casing for supporting the same from the drink mixer and guiding said casing for elevational movement relative to the drink mixer, projection means on the upper end of said casing engageable with the mixer-actuating member, a slide mounted on said casing, guided for sliding movement therealong and including a member projecting into said casing and cup-holding means engageable with the rim of a cup for holding the same and movable by the cup upward along said casing, and resilient force-exerting means within said casing engageable by said member and operable to exert a force on said slide to move the same downward along said casing when the cup is withdrawn from the cup-holding means.

24. An adapter for a drink mixer having a mixer-actuating member, comprising body means, supporting means supporting said body means from the drink mixer and guiding said body means for elevational movement relative to the drink mixer, resilient means engageable between said body means and said supporting means for supporting said body means resiliently, means engageable with said resilient means and capable of being manipulated to alter the force exerted by said resilient means between said supporting means and said body means, projection means on the upper portion of said body means engageable with the mixer-actuating member, and a slide mounted on said body means and slidable therealong and including a member engageable with the rim of a cup for holding the same.

References Cited by the Examiner

UNITED STATES PATENTS

| | | | |
|---|---|---|---|
| 186,173 | 1/1877 | Smith | 259—122 |
| 1,711,396 | 4/1929 | Ruetz | 259—107 |
| 1,714,865 | 5/1929 | Gentile | 259—131 |
| 2,051,883 | 8/1936 | Morgan | 259—125 |
| 2,131,190 | 9/1938 | Prince | 259—122 |
| 3,037,749 | 6/1962 | Stubler | 259—122 |

WALTER A. SCHEEL, *Primary Examiner.*

R. W. JENKINS, *Assistant Examiner.*